United States Patent
Aoki et al.

(10) Patent No.: US 7,317,860 B2
(45) Date of Patent: Jan. 8, 2008

(54) OPTICAL DEVICE HAVING PHOTONIC CRYSTAL STRUCTURE

(75) Inventors: Tsuyoshi Aoki, Kawasaki (JP); Masao Kondo, Kawasaki (JP); Kazuaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/365,820

(22) Filed: Mar. 2, 2006

(65) Prior Publication Data

US 2007/0077015 A1    Apr. 5, 2007

(30) Foreign Application Priority Data

Oct. 4, 2005 (JP) ............... 2005-290850

(51) Int. Cl.
*G02B 6/10* (2006.01)
*G02B 6/02* (2006.01)

(52) U.S. Cl. .............. 385/129; 385/125; 385/131; 385/40

(58) Field of Classification Search .......... 385/40, 385/123, 125, 129–132
See application file for complete search history.

(56) References Cited

U.S. PATENT DOCUMENTS

| | | | | |
|---|---|---|---|---|
| 5,751,466 | A * | 5/1998 | Dowling et al. | 359/248 |
| 6,671,097 | B2 * | 12/2003 | Fink et al. | 359/586 |
| 6,937,781 | B2 * | 8/2005 | Shirane et al. | 385/16 |
| 6,947,649 | B2 * | 9/2005 | Li et al. | 385/122 |
| 7,064,886 | B2 * | 6/2006 | Moon et al. | 359/321 |
| 7,123,804 | B2 * | 10/2006 | Baba et al. | 385/129 |
| 2001/0026659 | A1 * | 10/2001 | Sekine et al. | 385/40 |
| 2003/0048971 | A1 * | 3/2003 | Ionov | 385/10 |
| 2003/0185532 | A1 * | 10/2003 | Hosomi et al. | 385/129 |
| 2003/0202728 | A1 * | 10/2003 | Leonard et al. | 385/5 |
| 2004/0184752 | A1 * | 9/2004 | Aoki et al. | 385/123 |

FOREIGN PATENT DOCUMENTS

| | | |
|---|---|---|
| JP | 2000-249828 | 9/2000 |
| JP | 2001-174764 | 6/2001 |
| JP | 2001-242329 | 9/2001 |
| JP | 2002-333602 | 11/2002 |
| JP | 2003-248178 | 9/2003 |

OTHER PUBLICATIONS

E. Yablonovitch, "Inhibited Spontaneous Emission in Solid-State Physics and Electronics," Physical Review Letters, vol. 58, No. 20, The American Physical Society, May 1987, pp. 2059-2062.

H. Kosaka et al., "Superprism phenomena in photonic crystals," Physical Review B, vol. 58, No. 16, The American Physical Society, Oct. 1998, pp. R10 096-R10 099.

* cited by examiner

*Primary Examiner*—Hemang Sanghavi
(74) *Attorney, Agent, or Firm*—Kratz, Quintos & Hanson, LLP

(57) ABSTRACT

A photonic crystal structural body has a structure that a second mediums whose refractive index changes with an external field is periodically distributed in a first medium whose refractive index changes with the external field. An external field generator applies the external field to the photonic crystal structural body. It is possible to increase a change amount of a photonic band gap.

8 Claims, 8 Drawing Sheets

FIG.4

|  | POLARI-ZATION | 0 kV/cm | 700 kV/cm | TUNING WIDTH |
|---|---|---|---|---|
| COMPARATIVE EXAMPLE | TE | 1437.4 nm | 1435.4 nm | 2.0 nm |
|  | TM | 1507.7 nm | 1502.3 nm | 5.4 nm |
| EMBODIMEMT | TE | 1595.6 nm | 1587.8 nm | 7.8 nm |
|  | TM | 1635.9 nm | 1626.2 nm | 9.7 nm |

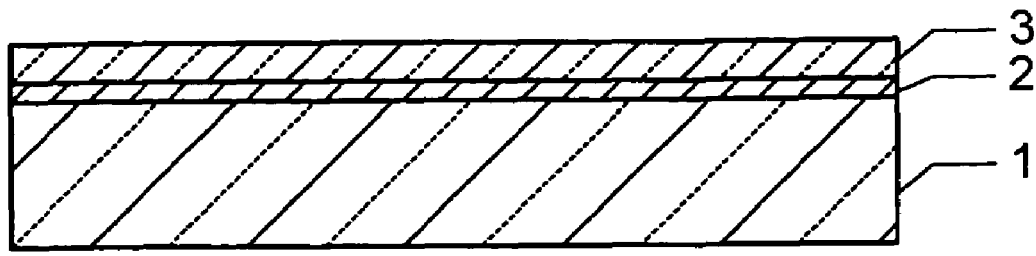
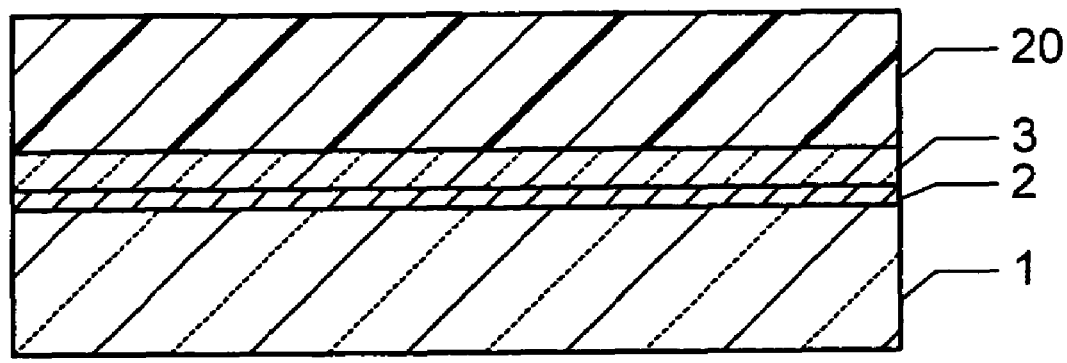
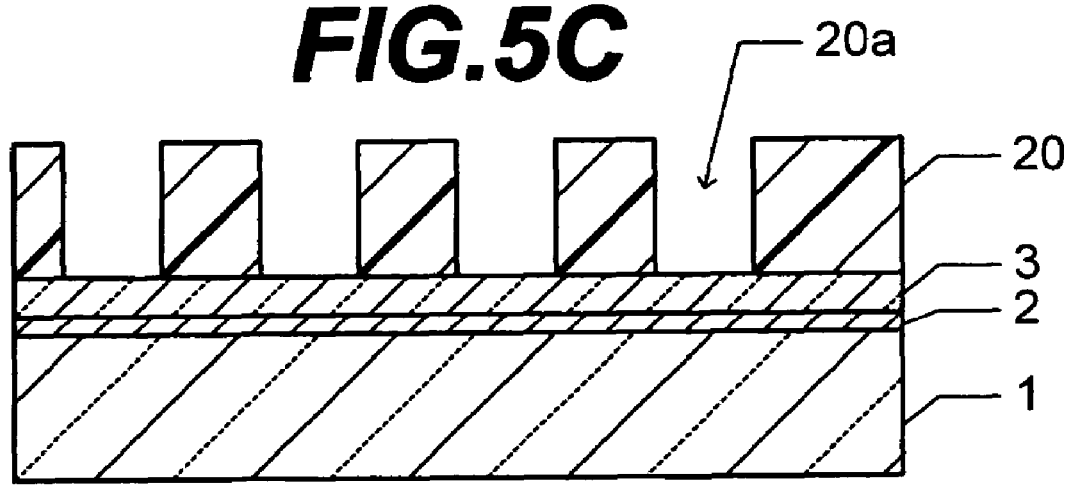

OPTICAL DEVICE HAVING PHOTONIC CRYSTAL STRUCTURE

CROSS REFERENCE TO RELATED APPLICATION

This application is based on and claims priority of Japanese Patent Application No. 2005-290850 filed on Oct. 4, 2005, the entire contents of which are incorporated herein by reference.

BACKGROUND OF THE INVENTION

A) Field of the Invention

The present invention relates to an optical device, and more particularly to an optical device whose optical transmission characteristics are changed by changing a photonic band structure by applying an external field to photonic crystals.

B) Description of the Related Art

In photonic crystals, in which mediums having a different refractive index from that of a background medium are periodically arranged in the background medium, it is known that a photonic band structure for electromagnetic waves different from usual optical crystals is generated. In the photonic crystals, existence of a frequency band called a photonic band gap inhibiting optical transmission has been reported (E. Yablonovitch, Physical Review Letters, Vol. 58, No. 20, pp. 2059 to 2062, The American Physical Society (1987)), and revelation of large optical deflection called a super prism effect has been reported (H. Kosaka, et al., Physical Review B Vol. 58, No. 16, R10 096, The American Physical Society (1998)). The photonic crystals having such properties are expected as core technologies for making compact optical devices.

Description will be made on an optical device utilizing photonic crystals disclosed in JP-A-2002-333602. In a background optical medium whose refractive index will not change, an optical medium having a variable refractive index is periodically distributed to form photonic crystals. As an electric field is applied to the photonic crystals, the refractive index of the periodically distributed optical medium changes. The photonic band structure changes therefore to change the optical transmission characteristics.

SUMMARY OF THE INVENTION

It is desired that a change amount in a photonic band gap is made large when photonic crystals are applied to an optical functional device such as an optical filter.

An object of the present invention is to provide an optical device capable of increasing a change amount in a photonic band structure, or a change amount in a photonic band gap for application to an optical filter or the like.

According to one aspect of the present invention, there is provided an optical device comprising: a photonic crystal structural body having a first medium and second mediums, refractive indices of the first medium and the second mediums changing with an external field, the second mediums being periodically distributed in the first medium; and external field generator for applying the external field to the photonic crystal structural body.

By changing the refractive indices of the first medium and second mediums, the photonic band structure can be changed greatly more than the refractive index of only one medium is changed.

BRIEF DESCRIPTION OF THE DRAWINGS

FIG. 4 is a table showing a wavelength and tuning width at a middle point of the photonic band gap of the optical devices of the first embodiment and the comparative example.

FIGS. 5A to 5F are cross sectional views of the optical device of the first embodiment in the process of manufacturing.

DESCRIPTION OF THE PREFERRED EMBODIMENTS

Figure 1A:
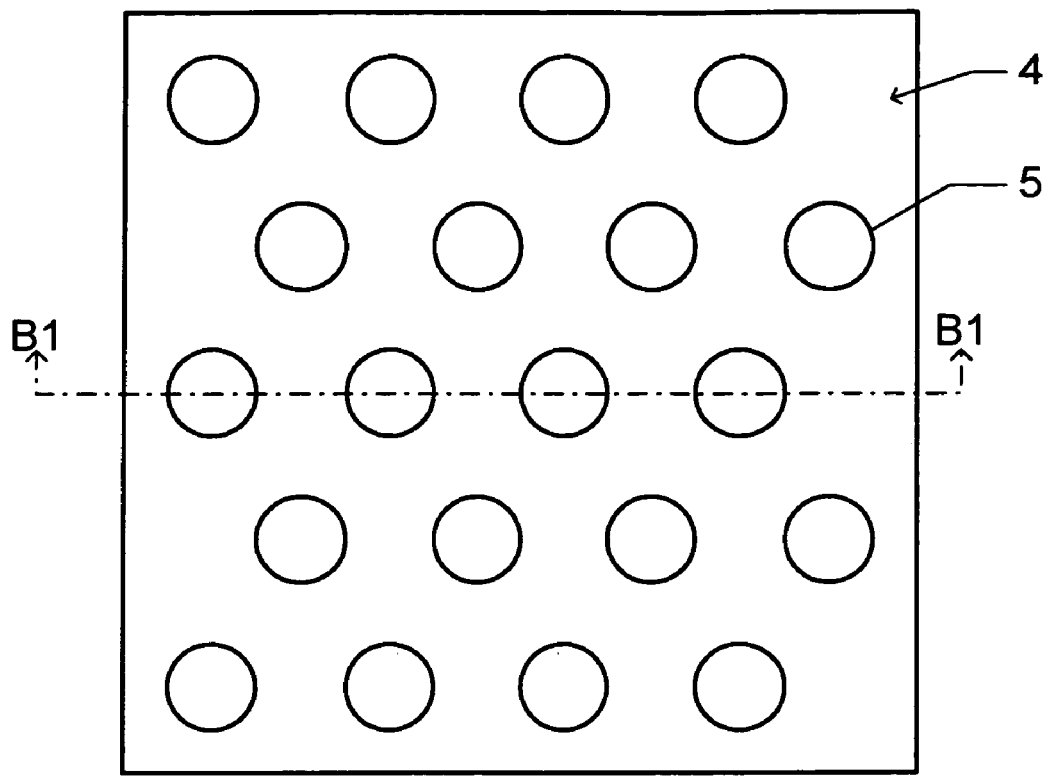
FIG. 1A is a plan view of a core layer of an optical device according to a first embodiment.
Figure 1B:
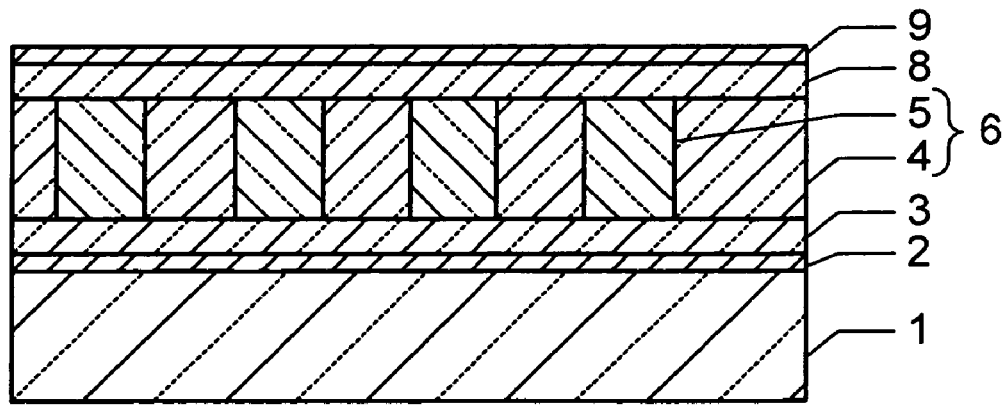
FIG. 1B is a cross sectional view of the optical device of the first embodiment.

FIG. 1A is a schematic plan view of a core layer (photonic crystal structural body) of an optical device of the first embodiment, and FIG. 1B is a cross sectional view taken along one-dot chain line B1-B1 shown in FIG. 1A.

As shown in FIG. 1B, a lower electrode 2, a lower clad layer 3, a core layer 6, an upper clad layer 8 and an upper electrode 9 are stacked on a support substrate 1 in this order. The support substrate 1 is made of single crystals such as Si, GaAs and $SrTiO_3$ (STO). The lower electrode 2 is made of metal such as Pt or conductive oxide such as $SrRuO_3$ (SRO) and has a thickness of 200 nm by way of example.

The lower clad layer 3 and upper clad layer 8 are made of MgO or the like and each of them has a thickness of 500 nm by way of example. The upper electrode 9 is made of metal such as Pt and Al or conductive oxide such as Sn doped $In_2O_3$ (ITO) and SRO and has a thickness of about 200 nm by way of example.

The core layer 6 has a structure that columnar mediums 5 are distributed in a background medium 4 periodically along an in-plane direction. A thickness of the background medium 4 and a height of the columnar mediums 5 are about 500 nm. Although FIG. 1A shows the periodical structure that the columnar mediums 5 are disposed at each lattice point of a triangle lattice, other periodical structures may be adopted. For example, the columnar mediums 5 may be disposed at each lattice point of a hexagonal lattice.

As a voltage is applied between the lower electrode 2 and upper electrode 9, an electric field can be generated in the core layer 6 along its thickness direction.

The background medium 4 and columnar mediums 5 have different refractive indices from each other and are made of materials which change its refractive indices upon application of an electric field. For example, the background medium 4 is made of $KTiOPO_4$ (KTP) and the columnar mediums 5 are made of $(Pb, La)(Zr, Ti)O_3$ (PLZT). For example, the composition ratio between Pb and La is 86.5:9 and the composition ratio between Zr and Ti is 65:35. The refractive indices of KTP and PLZT under no voltage application are 1.75 and 2.5, respectively. As an electric field is generated in the core layer 6, both the refractive indices lower.

In addition to MgO, material having a refractive index smaller than an effective refractive index of the core layer 6 may be adopted as the material of the lower clad layer 3 and upper clad layer 8. In addition to Pt and SRO, conductive material resistant against a heat treatment after the lower electrode 2 is formed may be adopted as the material of the lower electrode 2.

Figure 2A:
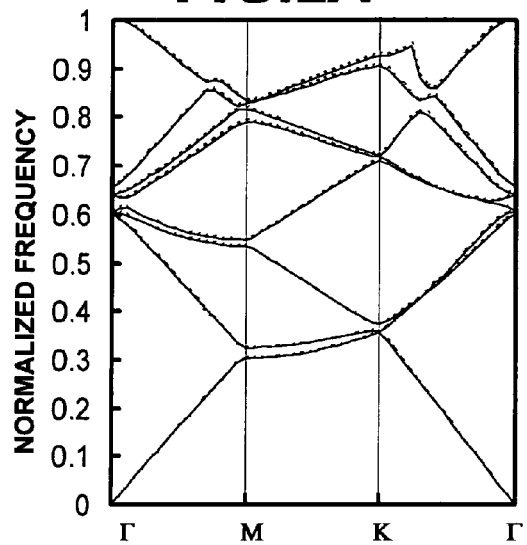
FIGS. 2A and 2B are graphs showing the photonic band structure of photonic crystals constituting the optical device of the first embodiment, for light in a TE mode and a TM mode, respectively.
Figure 2B:
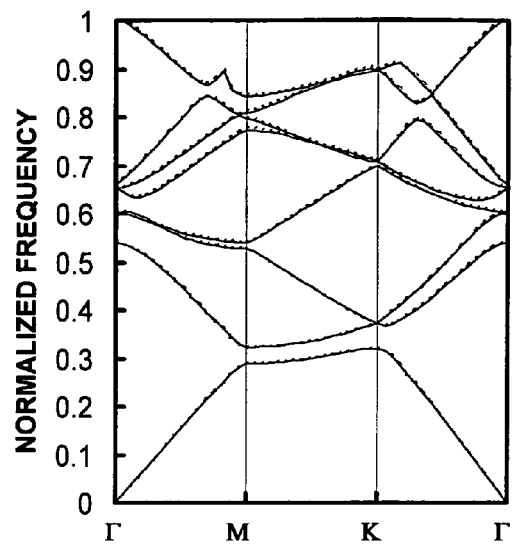

FIGS. 2A and 2B show the photonic band structure of the core layer 6 of the optical device according to the embodiment. A diameter of each of the columnar mediums 5 was set to 200 nm and a distance between the centers of the most adjacent two columnar mediums 5 was set to 500 nm. FIG. 2A shows the photonic band structure for light in the TE mode, and FIG. 2B shows the photonic band structure for light in the TM mode. In the TE mode, an optical wave has the magnetic field components polarized perpendicular to the substrate surface, and in the TM Mode, an optical wave has the electric field components polarized perpendicular to the substrate surface.

Γ, M and K affixed to the abscissa correspond to Γ, M and K points of the Brillouin zone. The ordinate represents a normalized frequency normalized by an array period of the columnar mediums 5. The normalized frequency is defined by $\omega a/2\pi c$ where a is a distance between centers of the most adjacent two columnar mediums 5 shown in FIG. 1A, ω is an angular frequency of an optical wave and c is a light velocity in vacuum. The solid lines in FIG. 1A show the photonic band structure under no electric field application, and dotted lines show the photonic band structure when an electric field of 700 kV/cm is applied to the core layer 6 in a thickness direction.

It can be understood that photonic gaps are formed for light transmitting along a direction corresponding to a line interconnecting Γ-M of the Brillouin zone, for light transmitting along a direction corresponding to a line interconnecting Γ-K of the Brillouin zone, and for light transmitting along the intermediate direction between the two directions.

Figure 2C:
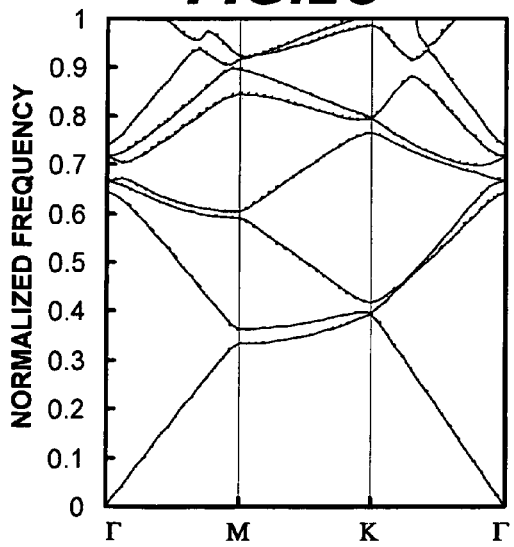
FIGS. 2C and 2D are graphs showing the photonic band structure of photonic crystals constituting an optical device of a comparative example, for light in the TE mode and TM mode, respectively.
Figure 2D:
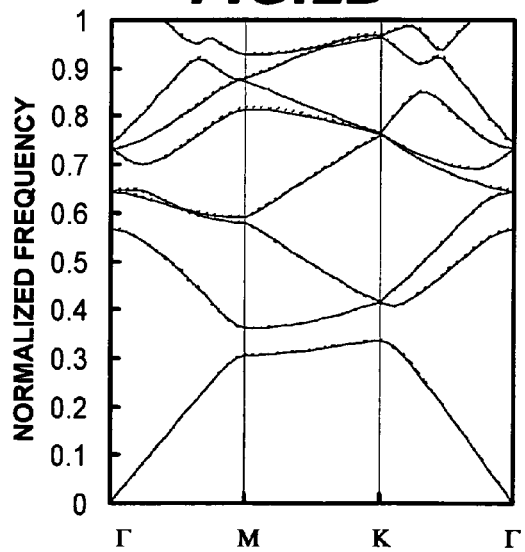
Figure 3A:
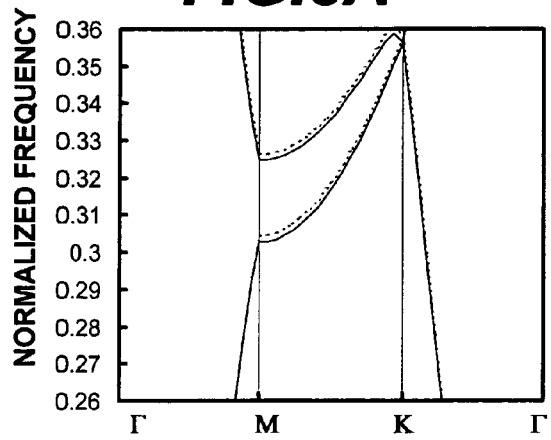
FIGS. 3A and 3B are graphs showing a photonic band gap and nearby areas of the photonic band structure of photonic crystals constituting the optical device of the first embodiment, for light in the TE mode and TM mode, respectively.
Figure 3B:
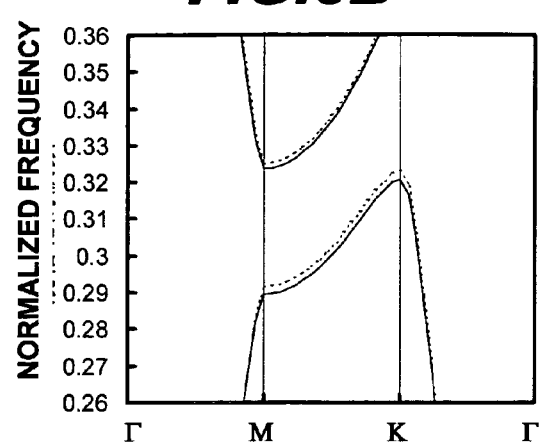
Figure 3C:
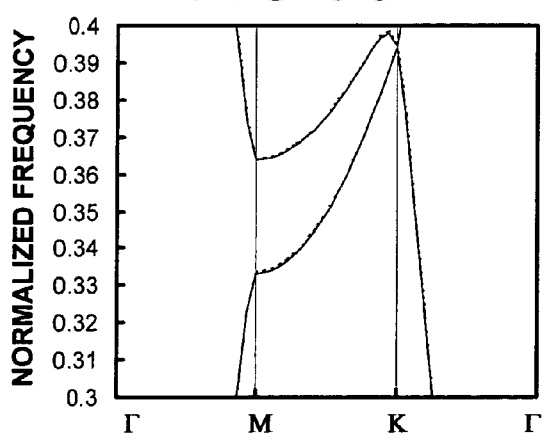
FIGS. 3C and 3D are graphs showing a photonic band gap and nearby areas of the photonic band structure of photonic crystals constituting an optical device of a comparative example, for light in the TE mode and TM mode, respectively.
Figure 3D:
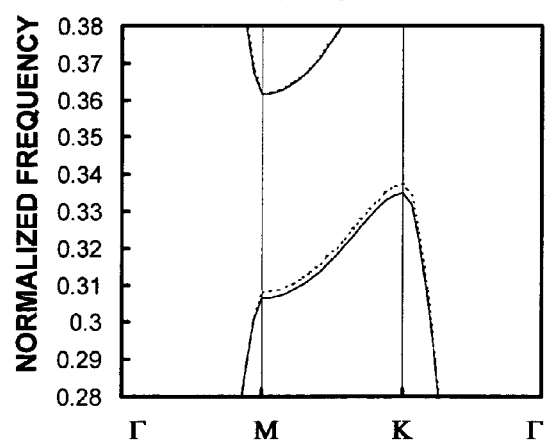

For comparison, the photonic band structures for the TE mode and TM mode are shown in FIGS. 2C and 2D, respectively, the background medium 4 being made of a medium having a fixed refractive index of 1.5.

FIGS. 3A to 3D are graphs showing an enlarged view of the area near the first order band gaps generated at the longest wavelength side of the photonic band structures shown in FIGS. 2A to 2D, respectively. It can be seen that as an electric field is applied, the photonic band structure shifts to the shorter wavelength side.

FIG. 4 shows frequencies and shift quantity (tuning width) of the photonic band gap at its center point for light transmitting along the direction corresponding to a straight line interconnecting Γ-M. For light in the TE mode, the tuning width of the optical device of the comparative example is 2.0 nm, whereas the tuning width of the optical device of the embodiment is 7.8 nm. For light in the TM mode, the tuning width of the optical device of the comparative example is 5.4 nm, whereas the tuning width of the optical device of the embodiment is 9.7 nm. It can be seen that a wide tuning width can be obtained by adopting the structure of the embodiment.

An effective refractive index of the core layer 6 can be roughly estimated by $(V_1 n_1 + V_2 n_2)/(V_1 + V_2)$ where $V_1$ is a volume of the background medium, $V_2$ is a total volume of the columnar media 5, $n_1$ is a refractive index of the background medium 4 and $n_2$ is a refractive index of the columnar medium 5. As the effective refractive index of the core layer 6 changes, the photonic band structure changes. As a change amount in the effective refractive index becomes large, a change in the photonic structure becomes remarkable. In order to make the tuning width wider, it is preferable to select material whose refractive index changes toward the same sense when an electric field is applied, as the materials of the background medium 4 and columnar mediums 5.

Next, with reference to FIGS. 5A to 5F, description will be made on a method of manufacturing an optical device according to the first embodiment.

As shown in FIG. 5A, a lower electrode 2 having a thickness of 200 nm and made of Pt, SRO or the like is formed by sputtering on a support substrate 1 made of single crystal such as Si, GaAs and STO. On the lower electrode 2, a lower clad layer 3 having a thickness of 500 nm and made of MgO or the like is formed by sputtering.

As shown in FIG. 5B, on the lower clad layer 3, a resist film 20 for electron beam exposure is formed. A thickness of the resist film 20 is 1 μm.

As shown in FIG. 5C, electron beam exposure and development are performed to form cylindrical openings 20a through the resist film 20. The openings 20a have a pattern fitting with the columnar mediums 5 shown in FIG. 1A.

Figure 5D:
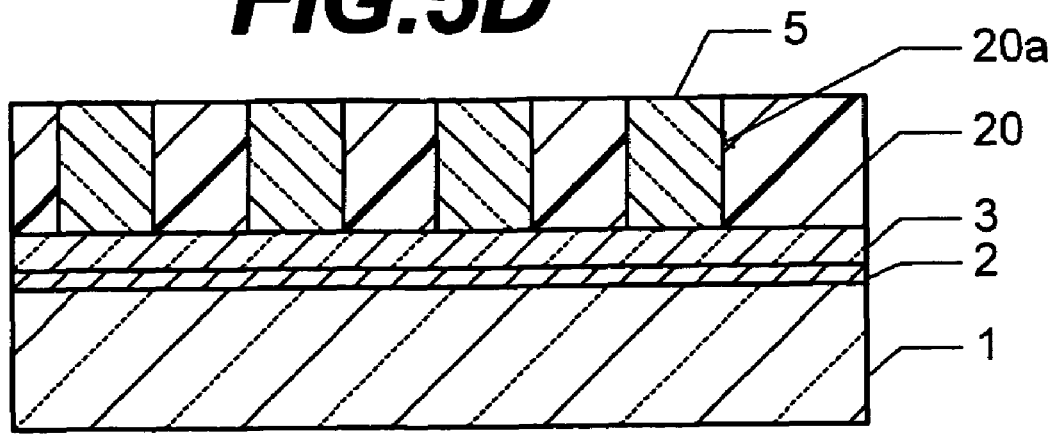
Figure 5E:
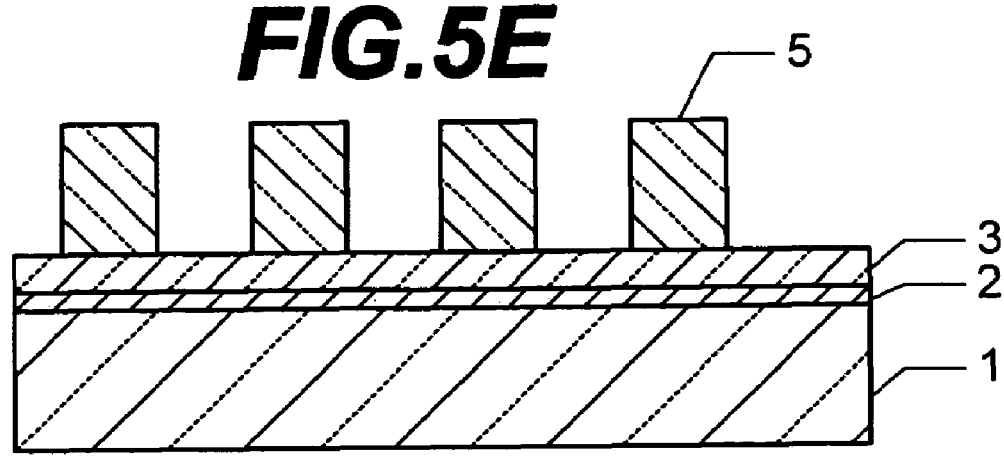

As shown in FIG. 5D, the openings 20a are filled with PLZT precursor solution which is then dried. As shown in FIG. 5E, after the resist film 20 is removed, the dried PLZT precursor is baked to form columnar mediums 5 made of PLZT. With this baking, a height of the columnar mediums 5 becomes about 500 nm.

Figure 5F:
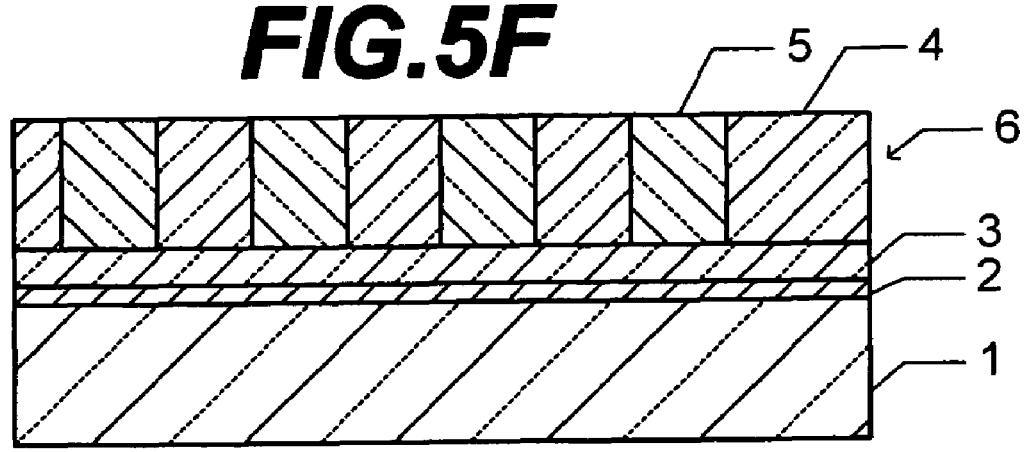

As shown in FIG. 5F, spaces between the columnar mediums 5 are filled with KTP precursor solution by spin coating or dipping. After the spaces are filled with KTP precursor solution, baking is performed to form the background medium 4 made of KTP. The background medium 4 deposited on the upper surfaces of the columnar mediums 5 is removed by chemical mechanical polishing (CMP). A core layer 6 having a flat upper surface can therefore be formed.

An upper clad layer 8 shown in FIG. 1B is formed on the core layer 6 by the same method as used for forming the lower clad layer 3. On the upper clad layer 8, an upper electrode 9 is formed by the same method as used for forming the lower electrode 2.

In this embodiment, although the resist film 20 having the openings 20a is used as a mold to form the periodical structure of the core layer 6 as shown in FIGS. 5C and 5D, the periodical structure may be formed by other methods. For example, after an optical medium film is formed on the whole surface of the lower clad layer, an etching mask is formed on the optical medium film which is then dry-etched, or without using the etching mask, the optical medium film is partially etched by using a focused ion beam. A method of forming an optical medium film may be, in addition to a sol-gel method, a sputtering method, a pulse laser evaporation method, a metal organic chemical vapor deposition (MOCVD) method, a hydrothermal synthesis method and the like.

In the above-described embodiment, although PLZT and KTP are used as the materials of the core layer 6, other two types of materials may be used which have different refractive indices from each other and change the refractive indices upon application of an electric field. For example, two materials may be used which are selected from a group consisting of $LiNbO_3$, $LiTaO_3$, $Ba_2NaNb_5O_{15}$, $Ba_2(K_{0.9}Na_{0.1})O_{15}$, $KH_2PO_4$ (KDP), $KD_2PO_4$, $(Sr_{0.5}Ba_{0.5})Nb_2O_6$, $(Sr_{0.75}Ba_{0.25})Nb_2O_6$, $BaTiO_3$, $Pb(Zr, Ti)O_3$, $PbTiO_3$, $(Pb_1,La)TiO_3$.

If at least one of the background medium 4 and columnar mediums 5 is made of ferroelectric, it is preferable to align crystal orientation of the ferroelectric. Ferroelectric having an aligned crystal orientation has a large remanent polarization and a high breakdown voltage. A change amount in a refractive index by an electro-optic effect such as a Pockels effect is influenced by the degree of remanent polarization. As the remanent polarization becomes large, a large refractive index change can be expected.

Figure 6A:
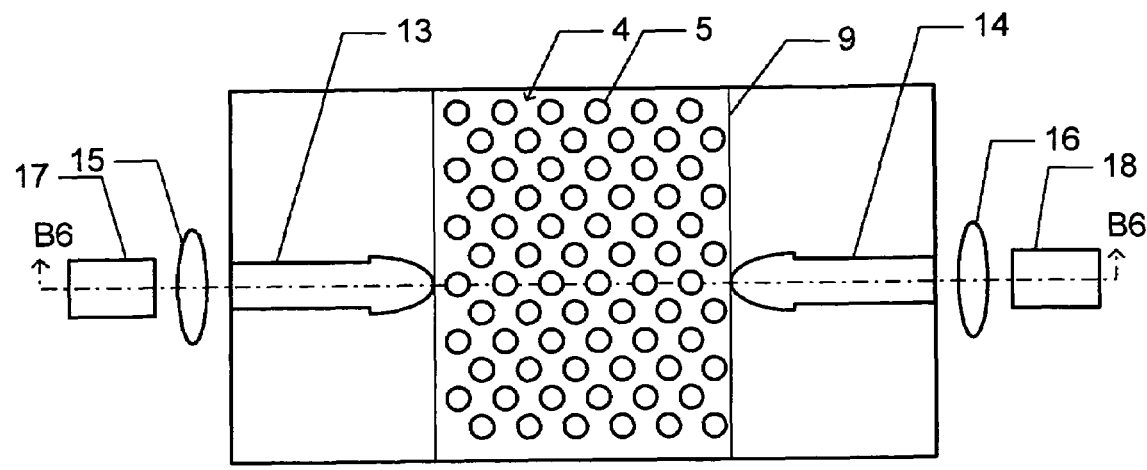
FIG. 6A is a plan view of an optical filter using the optical device of the first embodiment.
Figure 6B:
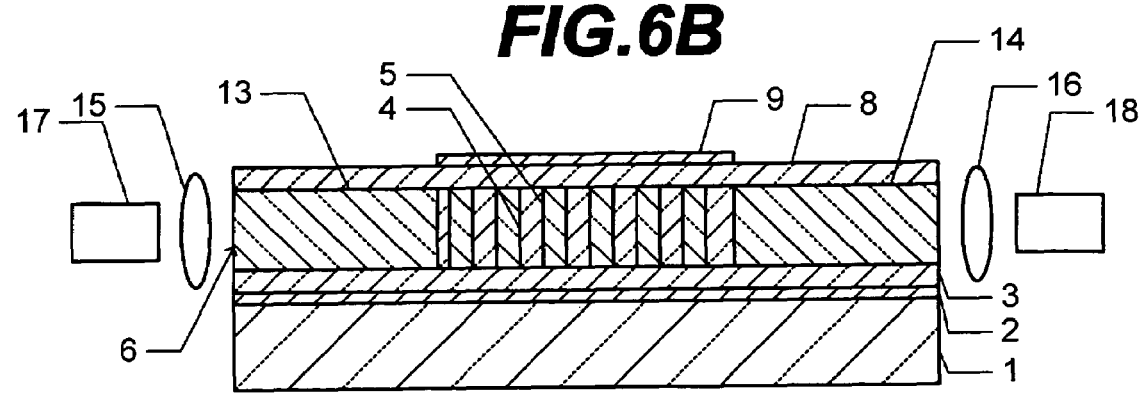
FIG. 6B is a cross sectional view of the optical filter.

FIG. 6A is a plan view of an optical filter using the optical device of the first embodiment, and FIG. 6B is a cross sectional view taken along one-dot chain line B6-B6 shown in FIG. 6A. Constituent elements of the optical filter shown in FIGS. 6A and 6B are represented by identical reference numerals to those of the corresponding constituent elements of the optical device shown in FIGS. 1A and 1B.

Only a partial region of the core layer 6 of the optical filter has the photonic crystal structure. The upper electrode 9 is disposed only above the region having the photonic crystal structure. On both sides contacting the region having the photonic crystal structure, channel waveguides 13 and 14 are formed. For example, the channel waveguides 13 and 14 are disposed over the lower electrode, and the side surfaces and upper surfaces of the channel waveguides are exposed to the atmospheric air. The front ends of the channel waveguides have a shape with a lens function. Light output from the channel waveguide 13 is input to the photonic crystal structure, passes through the photonic crystal structure straightforward and enters the other channel waveguide 14.

An optical fiber 17 is optically coupled to the channel waveguide 13 via a lens 15, and another optical fiber 18 is optically coupled to the channel waveguide 14 via a lens 16.

On/off control of the filter can be made by changing the photonic band structure of the photonic crystal structure region.

Figure 7A:
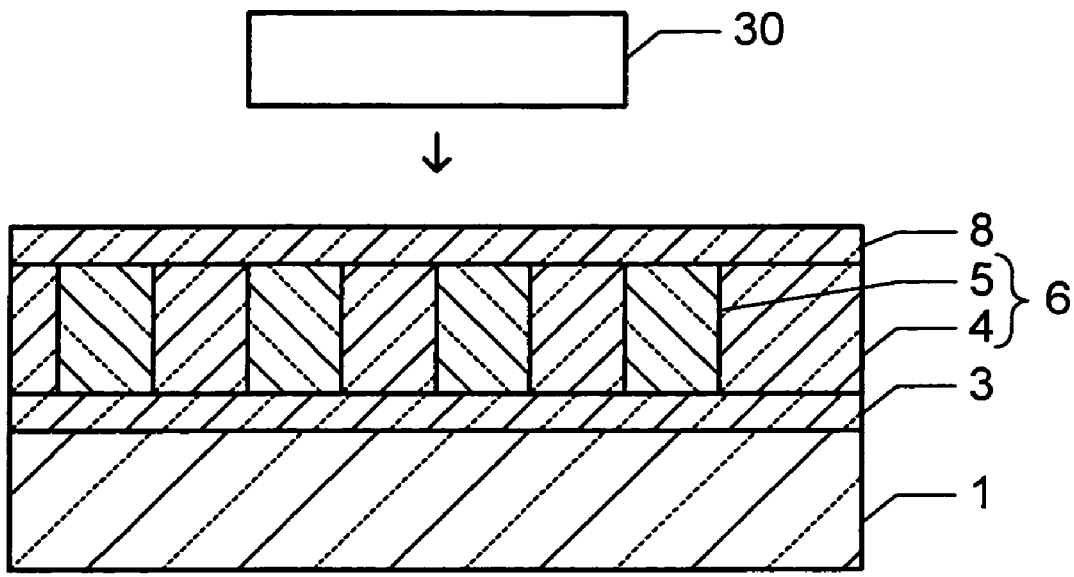
FIG. 7A is a cross sectional view of an optical device according to a second embodiment.

FIG. 7A is a cross sectional view of an optical device according to the second embodiment. Description will be made by paying attention to different points from the optical device of the first embodiment shown in FIGS. 1A and 1B. In the optical device of the second embodiment, the background medium 4 and columnar mediums 5 are made of material whose refractive index changes with irradiation of a laser beam. Such material may be a polymer having azobenzene as a side chain or the like. Since it is not necessary to apply an electric field to photonic crystals, the lower electrode 2 and upper electrode 9 shown in FIG. 1B are not disposed.

A laser beam irradiated from a laser light source 30 is incident upon the photonic crystal structure of the optical device. For example, a wavelength of the laser beam irradiated from the laser light source 30 is about 300 nm. A laser beam may be incident upon photonic crystals through the upper surface of the core layer 6, or through the sidewall of the photonic crystal structure. The photonic band structure can be changed by applying a laser beam to photonic crystals.

Figure 7B:
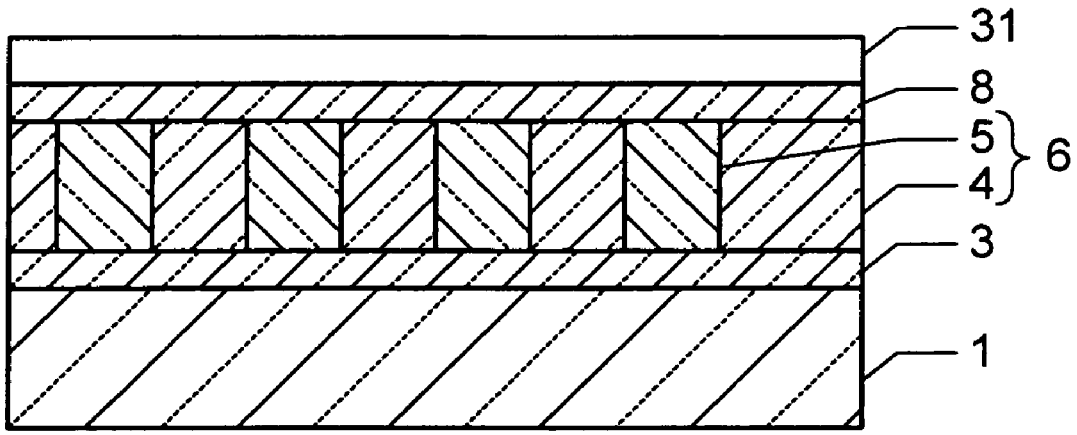
FIG. 7B is a cross sectional view of an optical device according to a third embodiment.

FIG. 7B is a cross sectional view of an optical device according to the third embodiment. Description will be made by paying attention to different points from the optical device of the first embodiment shown in FIGS. 1A and 1B. In the optical device of the third embodiment, the background medium 4 and columnar mediums 5 are made of material whose refractive index changes with a temperature change. Such material may be Si, $SiO_2$ or the like. Since it is not necessary to apply an electric field to photonic crystals, the lower electrode 2 and upper electrode 9 shown in FIG. 1B are not disposed.

A temperature controller 31 is disposed on the upper clad layer 8. The temperature controller 31 includes a heater made of a resistor wire having a zigzag pattern, and a Peltier element. The heater can heat the core layer 6 and the Peltier element can cool the core layer 6. The photonic band structure can be changed by changing a temperature of photonic crystals.

The present invention has been described in connection with the preferred embodiments. The invention is not limited only to the above embodiments. It will be apparent to those skilled in the art that other various modifications, improvements, combinations, and the like can be made.

What we claim are:

1. An optical device comprising:
a photonic crystal structural body having a first medium and second mediums, refractive indices of the first medium and the second mediums changing with an external field, the second mediums being periodically distributed along an in-lane direction in the first medium; and
external field generator for applying the external field to the photonic crystal structural body,
wherein said external field is an electric field or a laser light.

2. The optical device according to claim 1, wherein the photonic crystal structural body has a film shape, and the optical device further comprises a clad layer disposed on both sides of the photonic crystal structural body, the clad layer having a refractive index smaller than an effective refractive index of the photonic crystal structural body.

3. The optical device according to claim 1, wherein the external field is a heat and the external field generator applies a heat to the photonic crystal structural body.

4. The optical device according to claim 1, wherein at least one of the first medium and second mediums is ferroelectric.

5. The optical device according to claim 1, wherein the refractive indices of the first medium and the second mediums change toward a same sense when the external field is applied.

6. The optical device according to claim 1, wherein the first medium and the second mediums comprise materials which are selected from a group consisting of $LiNbO_3$, $LiTaO_3$, $Ba_2NaNb_5O_{15}$, $Ba_2(K_{0.9}Na_{0.1})O_{15}$, $KH_2PO_4$, $KD_2PO_4$, $(Sr_{0.5}Ba_{0.5})Nb_2O_6$, $(Sr_{0.75}Ba_{0.25})Nb_2O_6$, $BaTiO_3$, $Pb(Zr,Ti)O_3$, $PbTiO_3$, and $(Pb,La)TiO_3$.

7. The optical device according to claim 1, wherein the first medium and the second mediums comprise polymer having azobenzene as a side chain.

8. The optical device according to claim 1, wherein the refractive indices of the first medium and the second mediums change reversibly with the external field.

* * * * *